(12) United States Patent
Lyu et al.

(10) Patent No.: US 12,101,815 B2
(45) Date of Patent: *Sep. 24, 2024

(54) COMMUNICATION METHOD AND TERMINAL DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: QUECTEL WIRELESS SOLUTIONS CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,428

(22) Filed: Mar. 13, 2024

(65) Prior Publication Data

US 2024/0224332 A1 Jul. 4, 2024

Related U.S. Application Data

(63) Continuation of application No. 18/190,014, filed on Mar. 24, 2023, which is a continuation of application No. PCT/CN2022/118473, filed on Sep. 13, 2022.

(30) Foreign Application Priority Data

Aug. 3, 2022 (CN) .......................... 202210924290.3

(51) Int. Cl.
*H04W 74/0816* (2024.01)
*H04W 72/25* (2023.01)

(52) U.S. Cl.
CPC ....... *H04W 74/0816* (2013.01); *H04W 72/25* (2023.01)

(58) Field of Classification Search
None
See application file for complete search history.

(56) References Cited

U.S. PATENT DOCUMENTS

| | | |
|---|---|---|
| 2018/0368090 A1 | 12/2018 | Kadambar et al. |
| 2019/0281588 A1 | 9/2019 | Zhang et al. |

(Continued)

FOREIGN PATENT DOCUMENTS

| | | |
|---|---|---|
| CN | 111565475 | 8/2020 |
| CN | 114424640 | 4/2022 |

(Continued)

OTHER PUBLICATIONS

Ericsson, "Text proposal for TS 38.212 related to the agreements in [100b-e-NR-5G_V2X_NRSL-Mode-1-04]," R1-2003110, 3GPP TSG RAN WG1 #100bis-e, e-Meeting, Apr. 20-30, 2020, 3 pages.

(Continued)

*Primary Examiner* — Nguyen H Ngo
(74) *Attorney, Agent, or Firm* — Fish & Richardson P.C.

(57) ABSTRACT

Provided are a communication method and a terminal device. The communication method includes: sending, by a first terminal device, a first sidelink channel to a second terminal device over a first sidelink, wherein the first sidelink channel comprises first channel occupancy time (COT) sharing information, wherein the first sidelink channel further comprises a first physical sidelink control channel (PSCCH), the first PSCCH comprises first stage sidelink control information (SCI), and time domain resources on which the first COT sharing information and the first stage SCI are located are adjacent, and wherein the first COT sharing information is carried in a first physical sidelink shared channel (PSSCH) of the first sidelink channel

12 Claims, 6 Drawing Sheets

(56) References Cited

U.S. PATENT DOCUMENTS

| | | | |
|---|---|---|---|
| 2021/0092783 A1* | 3/2021 | Sun | H04W 76/15 |
| 2021/0195637 A1 | 6/2021 | Xue et al. | |
| 2021/0314899 A1 | 10/2021 | Shan et al. | |
| 2022/0095301 A1 | 3/2022 | Oviedo et al. | |
| 2023/0354425 A1* | 11/2023 | Jeon | H04L 5/0048 |
| 2023/0362988 A1* | 11/2023 | Liu | H04W 74/0808 |
| 2023/0413325 A1* | 12/2023 | Li | H04W 74/002 |

FOREIGN PATENT DOCUMENTS

| | | |
|---|---|---|
| CN | 114467314 | 5/2022 |
| CN | 114731528 | 7/2022 |
| CN | 114731686 | 7/2022 |
| CN | 114762374 | 7/2022 |
| CN | 114793333 | 7/2022 |
| CN | 115002787 | 9/2022 |
| EP | 4362591 | 5/2024 |
| WO | WO 2021062118 | 4/2021 |

OTHER PUBLICATIONS

Huawei, HiSilicon, "Updated views on Rel-18 sidelink enhancements," RP-212133, 3GPP TSG RAN Meeting #93-e, Electronic Meeting, Sep. 13-17, 2021, 8 pages.

International Search Report and Written Opinion in International Appln. No. PCT/CN2022/118473, mailed on Apr. 26, 2023, 13 pages (with partial English translation).

Lenovo et al., "Discussion on unlicensed spectrum for sidelink communication for Rel-18," 3GPP TSG RAN Meeting #93-e, RP-212066, Electronic Meeting, Sep. 13-17, 2021, 5 pages.

LG Electronics, "Feature lead summary for agenda item 7.2.4.5 Physical layer procedures for sidelink," R1-1907682, 3GPP TSG RAN WG1 #97, Reno, USA, May 13-17, 2019, 26 pages.

Notice of Allowance in Chinese Appln. No. 202210924290.3, dated Oct. 8, 2022, 4 pages (with Machine Translation).

Office Action in Chinese Appln. No. 202210924290.3, dated Sep. 14, 2022, 19 pages (with Machine Translation).

Extended European Search Report in European Appln No. 22925240.8, dated Jul. 8, 2024, 9 pages.

* cited by examiner

COMMUNICATION METHOD AND TERMINAL DEVICE

CROSS-REFERENCE TO RELATED APPLICATIONS

This application is a continuation of U.S. patent application Ser. No. 18/190,014, filed on Mar. 24, 2023, which is a continuation of International Application No. PCT/CN2022/118473, filed on Sep. 13, 2022, which claims priority to Chinese Patent Application No. 202210924290.3, filed on Aug. 3, 2022. All of the afore-mentioned patent applications are hereby incorporated by reference in their entireties.

TECHNICAL FIELD

The present application relates to the technical field of communications, and more specifically, to a communication method and a terminal device.

BACKGROUND

In unlicensed spectrum, a sidelink terminal device obtains a channel resource through a mechanism such as listen before talk (LBT). The terminal device can use the channel resource to perform sidelink communication within a channel occupancy time (COT).

Resources within the COT can also be shared to other terminal devices. How to perform COT sharing is an urgent problem to be resolved.

SUMMARY

The present application provides a communication method and a terminal device. Various aspects of the embodiments of the present application are described below.

According to a first aspect, a communication method is provided, the method including: sending, by a first terminal device, a first sidelink channel to a second terminal device over a first sidelink, where the first sidelink channel includes first COT sharing information, and the first COT sharing information satisfies one or more of the following: the first COT sharing information is carried in a first physical sidelink shared channel (PSSCH) of the first sidelink channel; and the first COT sharing information includes second COT sharing information and third COT sharing information, with the second COT sharing information corresponding to a first communication mode, and the third COT sharing information corresponding to a second communication mode.

According to a second aspect, a communication method is provided, the method including: receiving, by a second terminal device and over a first sidelink, a first sidelink channel sent by a first terminal device, where the first sidelink channel includes first COT sharing information, and the first COT sharing information satisfies one or more of the following: the first COT sharing information is carried in a first PSSCH of the first sidelink channel; and the first COT sharing information includes second COT sharing information and third COT sharing information, with the second COT sharing information corresponding to a first communication mode, and the third COT sharing information corresponding to a second communication mode.

According to a third aspect, a communication method is provided, the method including: sending, by a first terminal device, a first sidelink channel, where the first sidelink channel includes first COT sharing information, and the first COT sharing information is used to indicate that the first terminal device has allocated a first resource within a COT to a second terminal device; and the first resource is determined based on one or more of the following information: whether the second terminal device is a terminal device in a communication cluster in which the first terminal device is located; and a priority corresponding to the second terminal device.

According to a fourth aspect, a communication method is provided, the method including: receiving, by a second terminal device, a first sidelink channel, where the first sidelink channel includes first COT sharing information, and the first COT sharing information is used to indicate that a first terminal device has allocated a first resource within a COT to the second terminal device; and the first resource is determined based on one or more of the following information: whether the second terminal device is a terminal device in a communication cluster in which the first terminal device is located; and a priority corresponding to the second terminal device.

According to a fifth aspect, a terminal device is provided, the terminal device being a first terminal device and including: a communication module configured to send a first sidelink channel to a second terminal device over a first sidelink, where the first sidelink channel includes first COT sharing information, and the first COT sharing information satisfies one or more of the following: the first COT sharing information is carried in a first PSSCH of the first sidelink channel; and the first COT sharing information includes second COT sharing information and third COT sharing information, with the second COT sharing information corresponding to a first communication mode, and the third COT sharing information corresponding to a second communication mode.

According to a sixth aspect, a terminal device is provided, the terminal device being a second terminal device and including: a communication module configured to receive, over a first sidelink, a first sidelink channel sent by a first terminal device, where the first sidelink channel includes first COT sharing information, and the first COT sharing information satisfies one or more of the following: the first COT sharing information is carried in a first PSSCH of the first sidelink channel; and the first COT sharing information includes second COT sharing information and third COT sharing information, with the second COT sharing information corresponding to a first communication mode, and the third COT sharing information corresponding to a second communication mode.

According to a seventh aspect, a terminal device is provided, the terminal device being a first terminal device and including: a communication module configured to send a first sidelink channel, where the first sidelink channel includes first COT sharing information, and the first COT sharing information is used to indicate that the first terminal device has allocated a first resource within a COT to a second terminal device; and the first resource is determined based on one or more of the following information: whether the second terminal device is a terminal device in a communication cluster in which the first terminal device is located; and a priority corresponding to the second terminal device.

According to an eighth aspect, a terminal device is provided, the terminal device being a second terminal device and including: a communication module configured to receive a first sidelink channel, where the first sidelink channel includes first COT sharing information, and the first COT sharing information is used to indicate that a first terminal device has allocated a first resource within a COT to the second terminal device; and the first resource is determined based on one or more of the following information: whether the second terminal device is a terminal device in a communication cluster in which the first terminal device is located; and a priority corresponding to the second terminal device.

According to a ninth aspect, a communication apparatus is provided, the apparatus including a memory and a processor, where the memory is configured to store a program, and the processor is configured to call the program in the memory to perform the method according to any one of the first aspect to the fourth aspect.

According to a tenth aspect, an apparatus is provided, the apparatus including a processor configured to call a program from a memory to perform the method according to any one of the first aspect to the fourth aspect.

According to an eleventh aspect, a chip is provided, the chip including a processor configured to call a program from a memory to cause a device installed with the chip to perform the method according to any one of the first aspect to the fourth aspect.

According to a twelfth aspect, a computer-readable storage medium is provided, the computer-readable storage medium storing a program that causes a computer to perform the method according to any one of the first aspect to the fourth aspect.

According to a thirteenth aspect, a computer program product is provided, the computer program product including a program that causes a computer to perform the method according to any one of the first aspect to the fourth aspect.

According to a fourteenth aspect, a computer program is provided, where the computer program causes a computer to perform the method according to any one of the first aspect to the fourth aspect.

In the embodiments of the present application, when the first terminal device performs sidelink communication with the second terminal device, the COT sharing information is carried in the sidelink channel. The sharing method for the COT sharing information proposed in the embodiments of the present application helps to improve the utilization rate of sidelink channel resources.

DETAILED DESCRIPTION OF THE EMBODIMENTS

The technical solutions of the embodiments of the present application will be described below clearly and completely in conjunction with the accompanying drawings. Apparently, the embodiments described are only some rather than all of the embodiments of the present application. For ease of understanding, the terms and communication processes involved in the present application are first described below with reference to FIG. 1 to FIG. 5.

Figure 1:
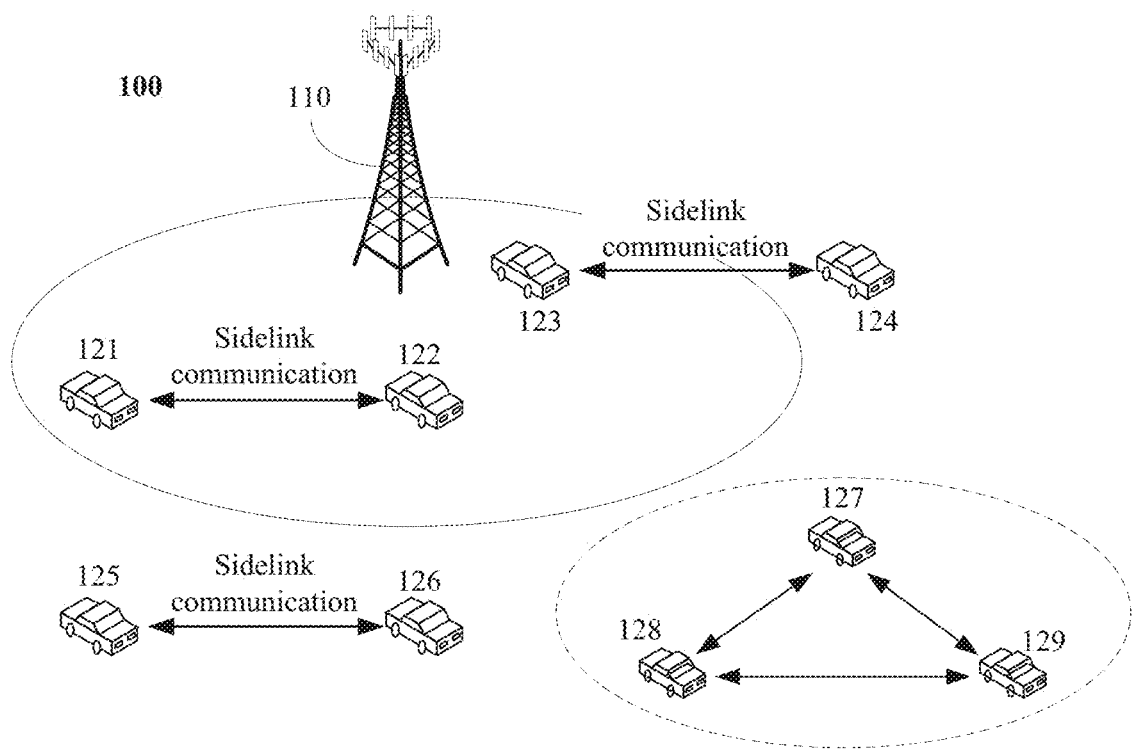
FIG. 1 is an example diagram of a wireless communications system to which the embodiments of the present application are applicable.
Figure 2:
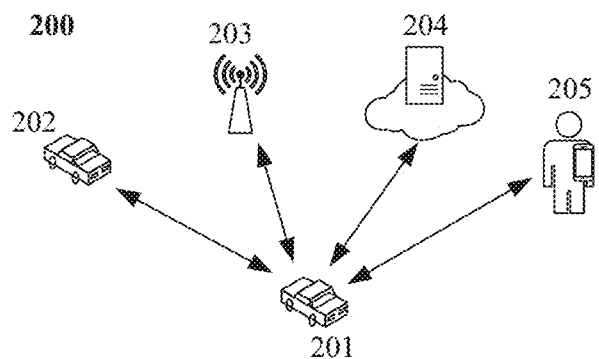
FIG. 2 is an example diagram of communication of NR-V2X.

FIG. 1 is an example diagram of a system architecture of a wireless communications system 100 to which the embodiments of the present application are applicable. The wireless communications system 100 may include a network device 110 and terminal devices 121 to 129. The network device 110 can provide communication coverage for a specific geographic area and can communicate with terminals within the coverage area.

In some implementations, terminal devices may communicate with each other through a sidelink (SL). The sidelink communication may also be referred to as proximity services (ProSe) communication, unilateral communication, side link communication, device-to-device (D2D) communication, or the like.

In other words, sidelink data is transmitted between terminal devices over a sidelink. The sidelink data may include data and/or control signaling. In some implementations, the sidelink data may be, for example, a physical sidelink control channel (PSCCH), a PSSCH, a PSCCH demodulation reference signal (DMRS), a PSSCH DMRS, or a physical sidelink feedback channel (PSFCH).

Several common sidelink communication scenarios are described below with reference to FIG. 1. Depending on whether the terminal devices in the sidelink are within the coverage of the network device, sidelink communication may include three scenarios. In scenario 1, the terminal devices perform sidelink communication within the coverage of the network device. In scenario 2, some of the terminal devices perform sidelink communication within the coverage of the network device. In scenario 3, the terminal devices perform sidelink communication outside the coverage of the network device.

As shown in FIG. 1, in scenario 1, terminal devices 121 and 122 can communicate with each other over a sidelink, and the terminal devices 121 and 122 are both within the coverage of the network device 110, or in other words, the terminal devices 121 and 122 are both within the coverage of the same network device 110. In this scenario, the network device 110 may send configuration signaling to the terminal devices 121 and 122, and accordingly, the terminal devices 121 and 122 communicate with each other over the sidelink based on the configuration signaling.

As shown in FIG. 1, in scenario 2, terminal devices 123 and 124 can communicate with each other over a sidelink, and the terminal device 123 is within the coverage of the network device 110, while the terminal device 124 is outside the coverage of the network device 110. In this scenario, the terminal device 123 receives configuration information from the network device 110, and communicates over the sidelink based on a configuration of the configuration signaling. However, since the terminal device 124 is outside the coverage of the network device 110, the terminal device 124 cannot receive the configuration information from the network device 110. In this case, the terminal device 124 may obtain a configuration of the sidelink communication based on pre-configured configuration information and/or the configuration information sent by the terminal device 123 within the coverage, so as to communicate with the terminal device 123 over the sidelink based on the obtained configuration.

In some cases, the terminal device 123 may send the configuration information to the terminal device 124 through a physical sidelink broadcast channel (PSBCH), so as to configure the terminal device 124 to communicate over the sidelink.

As shown in FIG. 1, in scenario 3, terminal devices 125 to 129 are all outside the coverage of the network device 110 and cannot communicate with the network device 110. In this case, all the terminal devices may perform sidelink communication based on pre-configuration information.

In some cases, the terminal devices 127 to 129 outside the coverage of the network device may form a communication cluster, and the terminal devices 127 to 129 in the communication cluster can communicate with each other. In addition, the terminal device 127 in the communication cluster may serve as a central control node, also referred to as a cluster header (CH). Correspondingly, the other terminal devices in the communication cluster may be referred to as "cluster members".

The terminal device 127 as the CH may have one or more of the following functions: responsible for establishment of the communication cluster; joining and leaving of the cluster members; resource coordination, allocation of sidelink transmission resources for the cluster members, and reception of sidelink feedback information from the cluster members; resource coordination with another communication cluster; and other functions.

It should be noted that FIG. 1 exemplarily shows a network device and a plurality of terminal devices. Optionally, the wireless communications system 100 may include a plurality of network devices, and another number of terminal devices may be included in the coverage of each network device, which is not limited in this embodiment of the present application.

Optionally, the wireless communications system 100 may further include other network entities such as a network controller and a mobility management entity, which is not limited in this embodiment of the present application.

It should be understood that the technical solutions in the embodiments of the present application can be applied to various communications systems, for example, a 5th generation (5G) system or new radio (NR) system, a long term evolution (LTE) system, an LTE frequency division duplex (FDD) system, and an LTE time division duplex (TDD). The technical solutions provided in the present application can also be applied to future communications systems, such as a 6th generation mobile communications system and a satellite communications system.

The terminal device in the embodiments of the present application may also be referred to as user equipment (UE), an access terminal, a subscriber unit, a subscriber station, a mobile, a mobile station (MS), a mobile terminal (MT), a remote station, a remote terminal, a mobile device, a user terminal, a wireless communications device, a user agent, or a user apparatus. The terminal device in the embodiments of the present application may be a device providing a user with voice and/or data connectivity and capable of connecting people, objects, and machines, such as a handheld device or vehicle-mounted device having a wireless connection function. The terminal device in the embodiments of the present application may be a mobile phone, a tablet computer (Pad), a notebook computer, a palmtop computer, a mobile internet device (MID), a wearable device, a vehicle, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the terminal device may be used to act as a base station. For example, the terminal device may act as a scheduling entity, which provides a sidelink signal between terminal devices in vehicle-to-everything (V2X) or D2D, etc. For example, a cellular phone and a car communicate with each other using sidelink data. A cellular phone and a smart home device communicate with each other, without the relay of a communication signal through a base station.

The network device in the embodiments of the present application may be a device for communicating with the terminal device. The network device may also be referred to as an access network device or a wireless access network device. For example, the network device may be a base station. The network device in the embodiments of the present application may be a radio access network (RAN) node (or device) that connects the terminal device to a wireless network. The base station may broadly cover various names in the following, or may be interchangeable with the following names, for example: a NodeB, an evolved NodeB (eNB), a next generation NodeB (gNB), a relay station, a transmitting and receiving point (TRP), a transmitting point (TP), an access point (AP), a master eNB MeNB, a secondary eNB SeNB, a multi-standard radio (MSR) node, a home base station, a network controller, an access node, a radio node, a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communication module, a modem, or a chip arranged in the device or apparatus described above. Alternatively, the base station may be a mobile switching center, a device that assumes the function of a base station in D2D, V2X, and machine-to-machine (M2M) communications, a network-side device in a 6G network, a device that assumes the function of a base station in a future communications system, or the like. The base station can support networks of the same or different access technologies. A specific technology and specific device form used by the network device are not limited in the embodiments of the present application.

The base station may be fixed or mobile. For example, a helicopter or drone may be configured to act as a mobile base station, and one or more cells may move according to the position of the mobile base station. In other examples, a helicopter or drone may be configured to serve as a device in communication with another base station.

In some deployments, the network device in the embodiments of the present application may be a CU or a DU, or the network device includes a CU and a DU. The gNB may further include an AAU.

The network device and the terminal device may be deployed on land, including indoor or outdoor, handheld or vehicle-mounted; or may be deployed on water; or may be deployed on an airplane, a balloon, and a satellite in the sky. In the embodiments of the present application, the scenarios where the network device and the terminal device are located are not limited.

It should be understood that all or some of the functions of the communications device in the present application may also be implemented by software functions running on hardware, or by virtualization functions instantiated on a platform (such as a cloud platform).

Communication Mode for Sidelink

With the development of sidelink communications technologies, the sidelink communications technologies relate to information exchange between various terminal devices. Taking a V2X communications system 200 shown in FIG. 2 as an example, vehicle-to-vehicle (V2V) communication between a terminal device 201 and a terminal device 202 relates to information exchange between the vehicles themselves. Vehicle-to-infrastructure (V2I) communication, vehicle-to-network (V2N) communication, and vehicle-to-pedestrian (V2P) communication respectively between the terminal device 201 and terminal devices 203 to 205 relate to information exchange between the vehicles and an external system.

The gradual expansion of the information exchange range imposes higher requirements on the communications system. For example, the communications system is required to support higher throughput, lower latency, higher reliability, larger coverage, more flexible resource allocation, etc. Taking the development of V2X as an example, in LTE-V2X, only a broadcast mode is supported between terminal devices for sidelink communication. In NR-V2X, three communication modes, namely, broadcast, groupcast, and unicast, can be supported.

Broadcast is the most basic communication mode in sidewalk communication. For the transmission mode of broadcast, sidelink data may be received by any terminal device around a terminal device as a transmitter end. For example, referring to FIG. 1, assuming that the terminal device 125 sends sidelink data in a broadcast mode as the transmitter end, any of the terminal devices 121 to 124 and the terminal devices 126 to 129 around the terminal device 125 may be used as the receiver end of the sidelink data.

Groupcast communication is used to support information exchange between terminal devices in a specific group (or referred to as a communication cluster), so as to assist in the negotiation and decision-making between terminal devices in the group. Sidelink groupcast has two transmission types. Type 1 is for a managed group with a stable connection relationship, which has clear ID information and group member information. Type 2 is for a connectionless group formed in a connectionless manner, for example, distance-based dynamically formed groupcast, which requires a communication distance of the current service to be clearly indicated.

For the transmission mode of groupcast, sidelink data may be received by all terminal devices in a communication cluster. Alternatively, the sidelink data may be received by all terminal devices within a specific transmission distance. For example, referring to FIG. 1, for a communication cluster including the terminal devices 127 to 129, when the terminal device 127 sends sidelink data in a groupcast mode, all the other terminal devices 128 and 129 in the communication cluster are terminal devices that receive the sidelink data. For another example, referring to FIG. 1, assuming that terminal devices within a preset range include the terminal devices 127 to 129, when the terminal device 127 sends sidelink data in a groupcast manner, all the other terminal devices 128 and 129 within the preset range are terminal devices that receive the sidelink data.

Unicast communication enables sidelink communication between two terminal devices. Taking NR-V2X as an example, radio resource control (RRC) signaling based on a PC5 interface enables reliable communication between one terminal device and another.

For the transmission mode of unicast, there is usually only one terminal device that receives sidelink data. Referring to FIG. 1, the terminal device 121 and the terminal device 122 may communicate in the transmission mode of unicast. For example, when the terminal device 121 performs sidelink communication with the terminal device 122, the terminal device 122 receives sidelink data as an only receiving device. The sidelink data may include a PSSCH and a PSCCH. Through demodulation, the terminal device 122 can obtain sidelink control information (SCI) related to sidelink transmission and scheduling. The SCI can help the terminal device 122 to receive and decode sidelink information.

In some communications systems (e.g., NR-V2X), sidelink unicast and groupcast services support a hybrid automatic repeat request (HARQ) mechanism by means of an acknowledgment (ACK)/a negative acknowledgment (NACK). For groupcast services, NACK-only HARQ may also be used. In addition, a blind retransmission mechanism is further supported. A sidelink HARQ feedback is sent by a terminal device at the receiver end to a terminal device at the transmitter end on a PSFCH.

Resource Pool for Sidelink

In some communications systems (e.g., NR), two resource configuration modes for sidelink resources are defined, namely, mode 1 and mode 2. In mode 1, the network device schedules a sidelink resource for the terminal device. For example, in FIG. 1, the terminal devices 121 to 123 are within the coverage of the network device 110, and the network device 110 may allocate sidelink resources for the terminal devices 121 to 123.

In mode 2, the terminal device independently selects a sidelink resource in a resource pool. In this mode, a process performed by the terminal device includes a resource probing process and/or a resource selection process. In the resource probing process, the terminal device may detect the occupancy of the sidelink resources by demodulating the SCI. Alternatively, the terminal device may detect the occupancy of the sidelink resources by measuring a received power of the sidelink. For example, the terminal devices 124 to 129 in FIG. 1 are outside the coverage of the network device 110, and the terminal devices 124 to 129 each may independently select a sidelink resource in mode 2.

Figure 3:
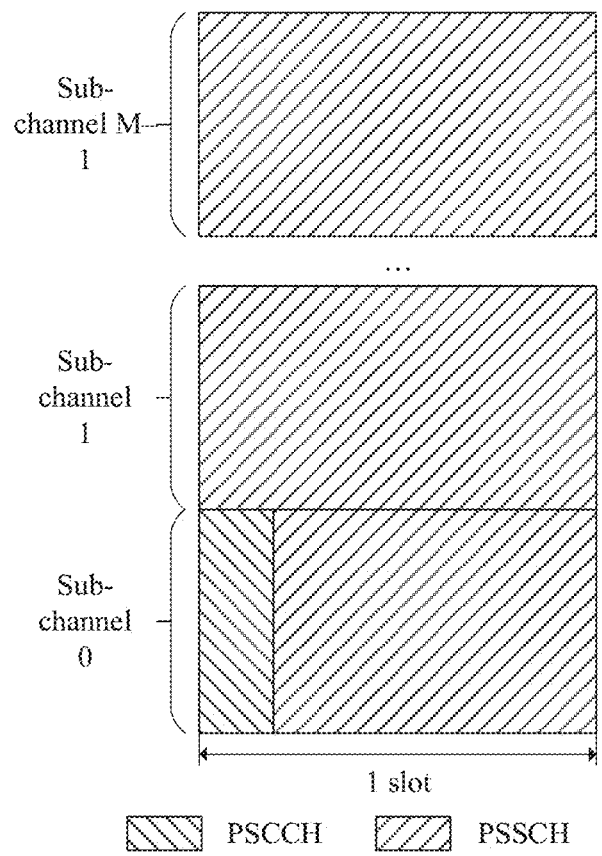
FIG. 3 is a schematic structural diagram of a single slot of a sidelink resource pool.

A sidelink resource pool to which the embodiments of the present application are applicable is described below by taking an NR-V2X resource pool as an example with reference to FIG. 3. A sub-channel can be understood as the minimum granularity of PSSCH resource allocation specified in NR-V2X. As shown in FIG. 3, the sidelink resource pool includes M sub-channels, namely, a sub-channel 0, a sub-channel 1, . . . , and a sub-channel M−1. Each sub-channel may consist of $N_{SubCHsize}$ physical resource blocks (PRBs), where the value of $N_{SubCHsize}$ is 10, 12, 15, 20, 25, 50, 75, or 100. In time domain, a terminal device may be configured with $M \times N_{SubCHsize}$ PRBs at a specific slot, and the $M \times N_{SubCHsize}$ PRBs can be used for one transmission. If the resource pool includes T slots, the resource pool from which the terminal device can independently select is $M \times N_{SubCHsize} \times T$ PRBs.

Taking unicast communication between a terminal device A and a terminal device B as an example, in the resource pool, the terminal device A as the transmitter end may sequentially select resources for sidelink communication with the terminal device B at the receiver end. For example, the terminal device A may directly perform sidelink communication with the terminal device B on a part of frequency resources in the same slot, or in the next slot. Alternatively, the terminal device A may select a part of resources in each sub-channel of each slot for sidelink communication with the terminal device B.

System Frame Structure for Sidelink

Figure 4:
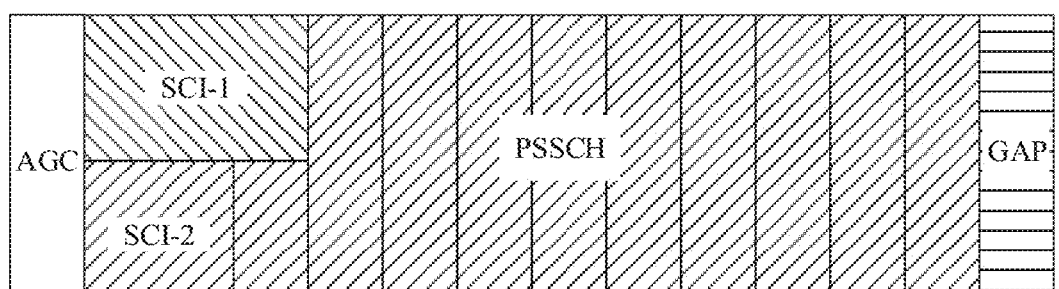
FIG. 4 is a schematic diagram of a frame structure that does not carry a PSFCH.
Figure 5:
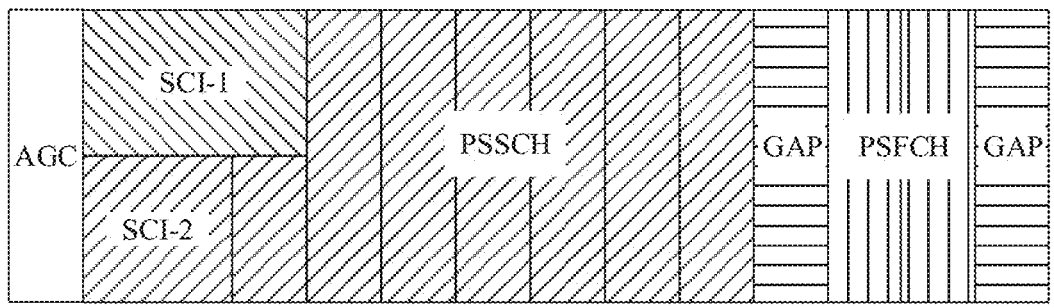
FIG. 5 is a schematic diagram of a frame structure that carries a PSFCH.

A frame structure (slot structure) of a sidelink system frame to which the embodiments of the present application are applicable is described below with reference to FIG. 4 and FIG. 5. The system frame is a single slot containing 14 time domain symbols. FIG. 4 shows a frame structure of a system frame that does not carry a PSFCH. FIG. 5 shows a frame structure of a system frame that carries a PSFCH.

SCI in FIG. 4 and FIG. 5 consists of two parts, namely, first stage SCI-1 and second stage SCI-2. The first stage SCI-1 is transmitted on the PSCCH, and the second stage SCI-2 is transmitted on the PSSCH.

Referring to FIG. 4, in time domain, the SCI-1 transmitted on the PSCCH occupies two or three sidelink symbols, starting from the second sidelink symbol (for example, an orthogonal frequency division multiplexing (OFDM) symbol) of the system frame. The transmission of the PSCCH at the start position of the slot helps the PSCCH to be obtained by the terminal device as the receiver end in advance, thereby reducing power consumption of the terminal device. In frequency domain, the PSCCH may occupy a plurality of PRBs. Usually, in order to reduce the complexity of blind detection of the PSCCH by the terminal device, configuration of only one number of PSCCH symbols and number of PRBs is allowed in one resource pool.

Still referring to FIG. 4, in time domain, the SCI-2 transmitted on the PSSCH also starts from the second sidelink symbol of the system frame and ends at the penultimate sidelink symbol of the system frame. In frequency domain, the PSSCH occupies a plurality of sub-channels of the system frame. As shown in FIG. 3, each sub-channel includes N consecutive PRBs.

Therefore, the PSCCH and apart of its associated PSSCH are transmitted on resources that are overlapping in time but non-overlapping in frequency, and the other part of the PSSCH and the PSCCH are transmitted on resources that are non-overlapping in time.

Usually, the first sidelink symbol in a slot is the repetition of the second sidelink symbol. When the terminal device receives the system frame, the first sidelink symbol may be used as an automatic gain control (AGC) symbol. Data on the AGC symbol is usually not used for data demodulation. The last symbol in the slot is a guard gap GAP symbol.

Referring to FIG. 5, when a PSFCH channel is carried in a slot, the penultimate sidelink symbol and the antepenultimate sidelink symbol in the system frame are used for PSFCH transmission. In addition, a GAP symbol needs to be reserved after both the PSSCH and the PSFCH. The value range of a PSFCH resource pre-configuration period may be {1, 2, 4} slots.

Communications Spectrum for Sidelink

The spectrum used by the communications systems includes licensed spectrum and unlicensed spectrum. An important direction for the expansion of the communications systems to different fields is the use of unlicensed spectrum. For example, NR deployed on unlicensed spectrum is referred to as NR-U.

Currently, a sidelink mainly uses licensed spectrum. The sidelink may also use unlicensed spectrum. A sidelink deployed on unlicensed spectrum may be referred to as SL-U.

Compared with the licensed spectrum, the unlicensed spectrum has the feature of sharing without license. For operators, spectrum sharing facilitates spectrum aggregation in a timely manner to dynamically support high-bandwidth services. Spectrum sharing can also extend the benefits of communications technologies (e.g., NR) to an operating entity that may not have access to the licensed spectrum.

The unlicensed spectrum needs to consider the coexistence of different radio access technology (RAT) systems, for example, typically a wireless fidelity (Wi-Fi) system and an LTE-based license assisted access (LAA) system. Different systems use frequency bands in the unlicensed spectrum in a spectrum contention manner according to the principles of channel access fairness and multi-RAT coexistence.

In the unlicensed spectrum, any RAT system needs to perform communication under the restrictions of the unlicensed spectrum regulatory rules. The regulatory rules include power and power spectral density levels, maximum COT, channel occupancy bandwidth, and channel monitoring mechanisms. In the same frequency band, each system needs to meet the requirements of the regulatory rules, and reasonably occupy and release channels, so as not to cause interference to another RAT system in the same frequency band. For example, in order to support different RATs in the unlicensed spectrum, communication between sidelink terminal devices is subject to the above-mentioned regulatory rules.

For the use of the unlicensed spectrum, the RAT system may employ a mandatory channel monitoring technology (e.g., LBT) to access a network. In other words, data can be transmitted only when it is detected that the current channel is not occupied. For example, a sidelink terminal device may initiate LBT, and the LBT can be Category 2 (Cat 2) LBT or Category 4 (Cat 4) LBT.

After obtaining a channel resource through the LBT, the terminal device may perform corresponding detection, and transmit data based on the above-mentioned regulatory rules. For example, the COT limit needs to be satisfied when the terminal device transmits data over the channel resource. In other words, a continuous data transmission should be limited within the COT time, and beyond this time, the terminal device needs to release the channel and perform LBT again.

Based on the foregoing description, it can be known that in the unlicensed spectrum, the sidelink terminal device obtains a sidelink channel resource through LBT. Based on the restrictions of the unlicensed spectrum regulatory rules, the terminal device can obtain COT information of the sidelink channel resource.

Within a COT, the direction of data transmission may vary. The terminal device that obtains the COT information may use a resource in the COT to send data to the terminal device at the receiver end of the sidelink, and the terminal device at the receiver end may also use the resource to send data to the terminal device at the transmitter end. If the resources within the COT are not used up, the remaining COT resources can also be shared to other sidelink terminal devices. Therefore, the terminal device can perform COT sharing to the other terminal devices based on the COT information, so as to avoid waste of resources.

How to perform COT sharing is an urgent problem to be resolved. A communication method according to an embodiment of the present application is described below with reference to FIG. 6. The sharing method for COT sharing information proposed in the method improves a utilization rate of sidelink channel resources.

Figure 6:
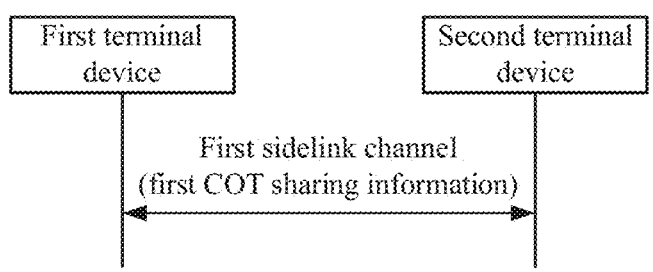
FIG. 6 is a schematic diagram of interaction between terminal devices in a communication method according to an embodiment of the present application.

The communication method shown in FIG. 6 is described from the perspective of interaction between a first terminal device and a second terminal device. The first terminal device and the second terminal device in FIG. 6 may be two terminals in sidelink communication, for example, a vehicle and a pedestrian or two vehicles in V2X. The first terminal device may be a transmitting terminal of the sidelink, and the second terminal device may be a receiving terminal. Alternatively, the first terminal device may be a receiving terminal of the sidelink, and the second terminal device may be a transmitting terminal.

The first terminal device may perform unicast communication, groupcast communication, or broadcast communication with the second terminal device. When the first terminal device performs unicast communication, the second terminal device may be a receiving terminal. When the first terminal device performs groupcast communication, the second terminal device may be a receiving terminal in a communication cluster.

Referring to FIG. 6, the first terminal device and the second terminal device interact through a first sidelink channel. The first terminal device may send the first sidelink channel to the second terminal device over a first sidelink, and the second terminal device receives the first sidelink channel. Alternatively, the second terminal device sends the first sidelink channel to the first terminal device, and the first terminal device receives the first sidelink channel.

The first sidelink channel may include one or more of channels such as a PSCCH, a PSSCH, and a PSFCH.

As shown in FIG. 6, the first sidelink channel further includes first COT sharing information (COT-SI). The first COT sharing information may be used to share resources (time domain resources and/or frequency domain resources) in a COT to other terminal devices.

In some embodiments, the first COT sharing information may be carried in the PSCCH. Because the PSCCH is located at the front of a slot, another terminal device can obtain the first COT sharing information as early as possible.

In some embodiments, the first COT sharing information may be carried in the PSSCH. The first COT sharing information may be transmitted on a resource that is overlapping in time but non-overlapping in frequency with a part of the PSSCH.

The first COT sharing information may occupy one symbol or a plurality of symbols. The plurality of symbols are, for example, two consecutive symbols.

The first COT sharing information may be located on any symbol of the PSSCH. For example, the first COT sharing information may be located on a symbol adjacent to the SCI, or may be located on a symbol not adjacent to the SCI. This will be described in detail below with reference to FIG. 7 to FIG. 10 using an example in which time domain resources on which the first COT sharing information and the SCI are located are adjacent.

The first COT sharing information may include various types of COT sharing information. The plurality of types of COT sharing information may be in a one-to-one correspondence with a plurality of communication modes. For example, in the case that the first COT sharing information includes second COT sharing information and third COT sharing information, the second COT sharing information may correspond to a first communication mode, and the third COT sharing information may correspond to a second communication mode.

The first communication mode or the second communication mode may be one of the plurality of transmission modes of the sidelink, which is not limited herein. For example, the first communication mode may be unicast communication or groupcast communication.

In some embodiments, the first COT sharing information may include the second COT sharing information. The first communication mode corresponding to the second COT sharing information may be unicast communication. The second COT sharing information corresponds to unicast communication, that is, the second COT sharing information is COT sharing information for unicast communication. For example, the second COT sharing information may indicate one or more shareable resources, and the one or more resources can be shared for use by terminal devices based on unicast communication on other sidelinks. In some embodiments, the second COT sharing information is represented by $COT\text{-}SI_{unicast}$.

In some embodiments, the first COT sharing information may include the third COT sharing information. The second communication mode corresponding to the third COT sharing information may be groupcast communication. The third COT sharing information corresponds to groupcast communication, that is, the third COT sharing information is COT sharing information for groupcast communication. For example, the third COT sharing information may indicate one or more shareable resources, and the one or more resources can be shared for use by other terminal devices in the same communication cluster as the first terminal device. In some embodiments, the third COT sharing information is represented by $COT\text{-}SI_{cast}$.

In some embodiments, the first COT sharing information may include both the above-mentioned second COT sharing information and third COT sharing information.

In some embodiments, the first COT sharing information may include information indicating start and end times of the COT of the first terminal device. For example, the first COT sharing information may include the start time and the end time of the COT. For another example, the first COT sharing information may include the start time and a duration of the COT.

In some embodiments, the first COT sharing information may further be used to indicate various types of resource information. For example, the first COT sharing information may indicate an LBT bandwidth supported within the COT. For another example, the first COT sharing information may indicate unused resources within the COT. The unused resources are the remaining resources within the current COT. For another example, the first COT sharing information may indicate resources allowed for use by a third terminal device participating in COT sharing. For the third terminal device, the third terminal device may participate in the sharing of COT resources by detecting the first COT sharing information.

Based on the information or resources indicated by the COT sharing information, as well as the communication mode corresponding to the COT sharing information, the first terminal device can reasonably allocate the resources within the COT to other terminal devices. For example, the resources may be allocated based on priorities of other terminal devices. This will be described below in detail.

As can be seen from FIG. 6, the first COT sharing information is carried in the first sidelink channel, and the sidelink terminal device can obtain various indication information of the shared resources within the COT. Based on the indication information, the terminal device can specify the duration and the remaining resources of the COT sharing, so as to more reasonably and effectively utilize the sidelink channel resources corresponding to the COT sharing information.

Figure 7:
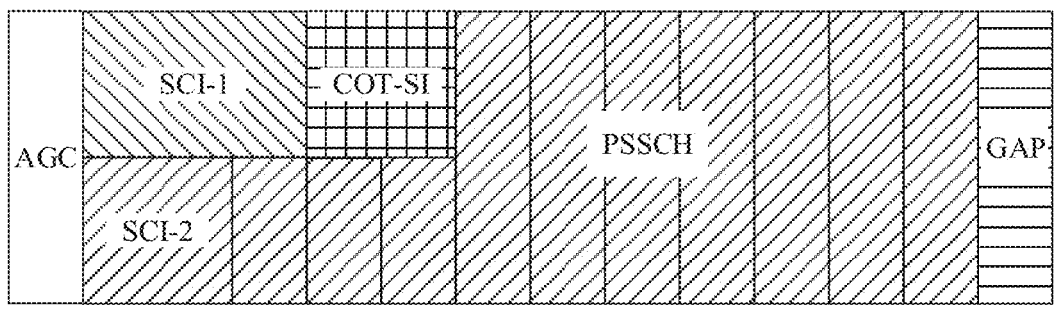
FIG. 7 is a schematic diagram of a frame structure that includes COT-SI and does not carry a PSFCH according to an embodiment of the present application.
Figure 8:
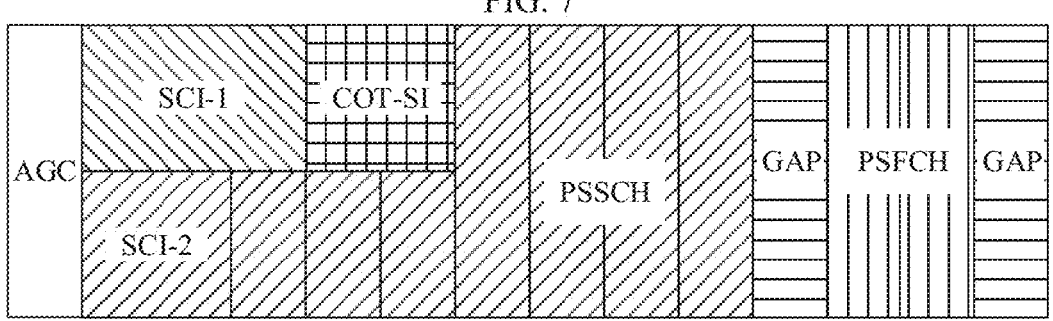
FIG. 8 is a schematic diagram of a frame structure that includes COT-SI and carries a PSFCH according to an embodiment of the present application.

As mentioned above, the first COT sharing information (COT-SI) may be carried in the PSSCH of the first sidelink channel. Taking the COT-SI being adjacent to the SCI as an example, different frame structures including the COT-SI are respectively described in detail below with reference to FIG. 7 to FIG. 10. FIG. 7 is a schematic diagram of a frame structure that includes COT-SI and does not carry a PSFCH. FIG. 8 is a schematic diagram of a frame structure that includes COT-SI and carries a PSFCH.

The SCI includes the SCI-1. The COT-SI being adjacent to the SCI may mean that time domain resources of the COT-SI and the SCI-1 are adjacent. If the last symbol on which the SCI-1 is located is set as a first symbol, the time domain resource on which the COT-SI is located is one symbol or a plurality of consecutive symbols following the first symbol.

As shown in FIG. 7 and FIG. 8, the COT-SI occupies two consecutive symbols. The SCI-1 is located on the second to fourth symbols of the frame structure, and the fourth symbol may be the first symbol. The COT-SI is located on the fifth and sixth symbols. In other words, the time domain resources of the COT-SI and the SCI-1 are adjacent.

Compared with FIG. 4 and FIG. 5 above, in time domain, the terminal device can obtain indication information of the COT-SI on the next symbol immediately after demodulating the PSCCH.

Figure 9:
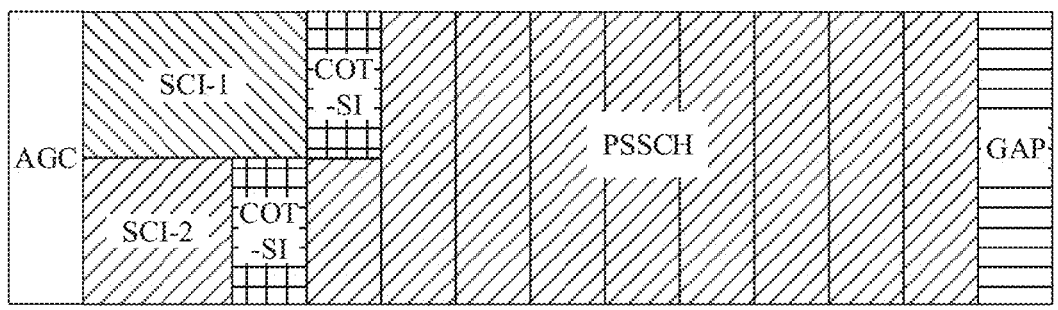
FIG. 9 is a schematic diagram of a frame structure that has COT-SI divided into two parts and does not carry a PSFCH according to an embodiment of the present application.
Figure 10:
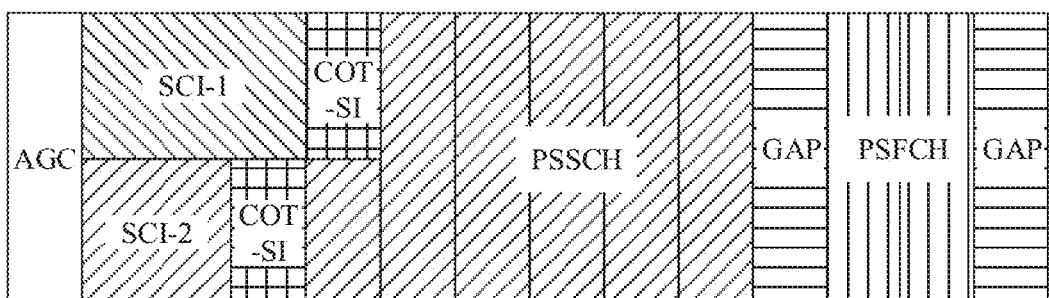
FIG. 10 is a schematic diagram of a frame structure that has COT-SI divided into two parts and carries a PSFCH according to an embodiment of the present application.

As described above, the COT-SI may further include the second COT sharing information and the third COT sharing information. The second COT sharing information and the third COT sharing information may be transmitted as a whole in the manner shown in FIG. 7 or FIG. 8, or each may be transmitted on one or more symbols. FIG. 9 is a schematic diagram of a frame structure that has COT-SI divided into two parts and does not carry a PSFCH. FIG. 10 is a schematic diagram of a frame structure that has COT-SI divided into two parts and carries a PSFCH.

The second COT sharing information and the third COT sharing information each may occupy one or more symbols. The first sidelink channel includes the SCI-1 and the SCI-2. The second COT sharing information may be adjacent to the time domain resource on which the SCI-1 is located, and the third COT sharing information may be adjacent to the time domain resource on which the SCI-2 is located. Alternatively, the third COT sharing information may be adjacent to the time domain resource on which the SCI-1 is located, and the second COT sharing information may be adjacent to the time domain resource on which the SCI-2 is located.

As shown in FIG. 9 and FIG. 10, the two parts of the COT-SI are the second COT sharing information and the third COT sharing information that each occupy one symbol. The last symbol of the SCI-1 is the fourth symbol, and the second COT sharing information or the third COT sharing information is located on the fifth symbol adjacent to the time domain resource on which the SCI-1 is located. The last symbol of the SCI-2 is the third symbol, and the third COT sharing information or the second COT sharing information is located on the fourth symbol adjacent to the time domain resource on which the SCI-2 is located.

In FIG. 9 and FIG. 10, if the second COT sharing information is COT-SI$_{unicast}$, and the third COT sharing information is COT-SI$_{cast}$, COT-SI$_{unicast}$ and COT-SI$_{cast}$ each are represented by one symbol adjacent to the SCI. By demodulating the SCI, the terminal device can obtain indication information of the COT-SI respectively corresponding to unicast and groupcast as early as possible.

The interaction between the first terminal device and the second terminal device through the first sidelink channel and the design examples of the frame structure of the first COT sharing information in the first sidelink channel are described above using FIG. 6 to FIG. 10. The first COT sharing information is used to indicate a status of resources that can be shared within the COT. The status of the resources within the COT sharing is described in detail below with reference to FIG. 11.

Figure 11:
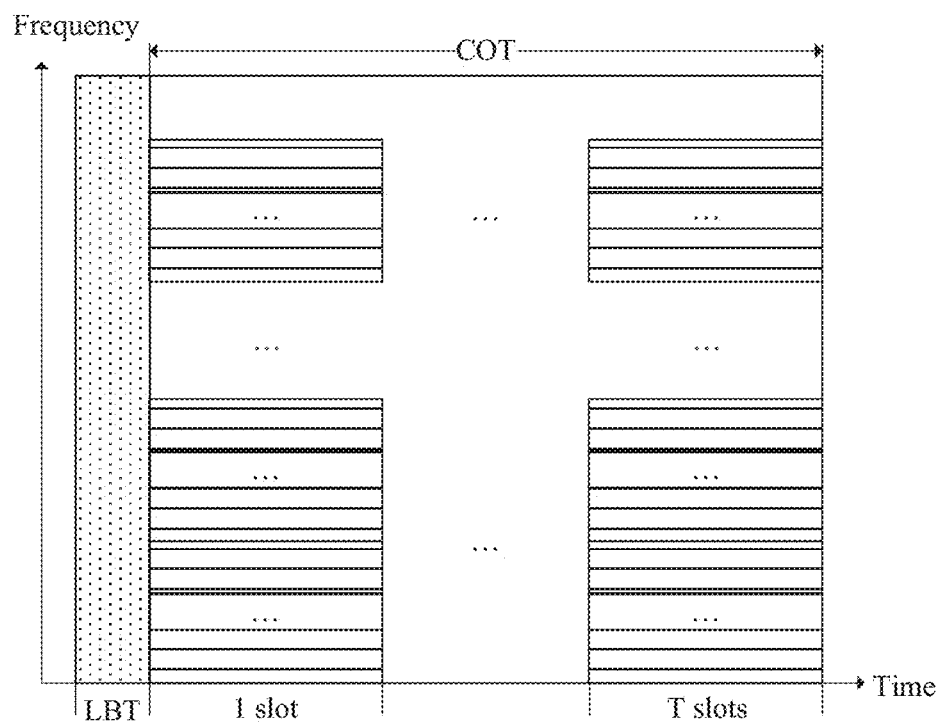
FIG. 11 is a schematic structural diagram of a COT resource obtained by a terminal device through LBT.

As shown in FIG. 11, after LBT, the terminal device may obtain a channel resource within the COT. In frequency domain, the channel resource includes a plurality of sub-channels shown in FIG. 3. In time domain, the channel resource includes T slots within the COT. When there are M sub-channels, and each sub-channel contains N$_{SubCHsize}$ PRBs, the size of the entire resource of the COT sharing initiated by the terminal device is M×N$_{SubCHsize}$×T PRBs.

In the groupcast and unicast communication modes of the sidelink, after the resources within the COT are used for communication between terminal devices in a communication cluster, there may be remaining unused resources. As described above, these remaining resources may be shared to other sidelink terminal devices outside the communication cluster, so as to improve a utilization rate of sidelink channel resources within the COT.

Further, if a plurality of sidelinks are to join, or the remaining resources within the COT cannot satisfy requirements of all the sidelinks, it is necessary to consider how to allocate resources to avoid a collision.

In order to better utilize the resources within the COT, a communication method provided in another embodiment of the present application can reasonably allocate the resources within the COT based on the COT sharing information.

Figure 12:
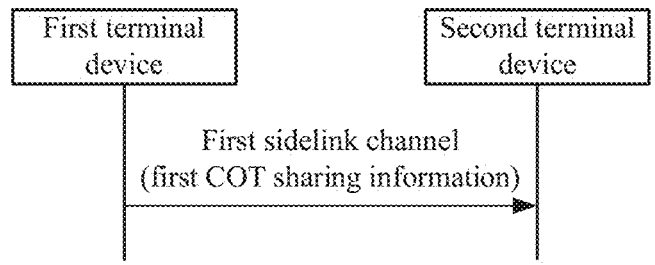
FIG. 12 is a schematic diagram of communication between terminal devices in a communication method according to another embodiment of the present application.

The communication method according to another embodiment of the present application will be described below with reference to FIG. 12. The communication method shown in FIG. 12 is described from the perspectives that a first terminal device sends a first sidelink channel to a second terminal device and that the second terminal device receives the first sidelink channel. The first terminal device and the second terminal device in FIG. 12 may be two terminals in sidelink communication, for example, a vehicle and a pedestrian or two vehicles.

A difference from FIG. 6 is that the first terminal device is a transmitting terminal of a sidelink, and the second terminal device is a receiving terminal. In some embodiments, the first terminal device obtains a resource within a COT through LBT, and the first terminal device may also be referred to as an initiating terminal for COT sharing.

The second terminal device may be one or more receiving terminals on the sidelink that sends the first sidelink channel, or may be one or more terminal devices on another sidelink. In other words, the second terminal device may be a terminal device in a communication cluster in which the first terminal device is located, or may be a terminal device outside the communication cluster in which the first terminal device is located. For the sake of conciseness, in the following description, an in-cluster terminal device is used to represent a second terminal device in the communication cluster in which the first terminal device is located, and an out-cluster terminal device is used to represent a second terminal device outside the communication cluster in which the first terminal device is located.

In some embodiments, the second terminal device may be an in-cluster terminal device. The second terminal device may receive the first sidelink channel over the sidelink of the first terminal device.

In some embodiments, the second terminal device may be an out-cluster terminal device. The second terminal device may receive the first sidelink channel through detection. The detection is, for example, detection of sidelink sharing by the second terminal device through LBT.

The in-cluster terminal device may be a terminal device at the receiver end in unicast communication, or may be a plurality of terminal devices in groupcast communication. The out-cluster terminal device may be one or more terminal devices outside a unicast and/or groupcast communication cluster. The in-cluster terminal device and the out-cluster terminal device in this embodiment of the present application will be described respectively based on unicast and groupcast communication modes with reference to FIG. 13 and FIG. 14.

The first sidelink channel also includes first COT sharing information. The first COT sharing information may further be used to indicate that the first terminal device has allocated a first resource within a COT to the second terminal device.

When the first COT sharing information includes second COT sharing information and third COT sharing information, the second COT sharing information and the third COT sharing information may indicate the first resource based on corresponding communication modes. In some embodiments, when a first communication mode corresponding to the second COT sharing information is unicast, the first resource indicated by the second COT sharing information may be allocated to a corresponding terminal device. Other terminal devices can also detect the COT sharing information. In some embodiments, when a second communication mode corresponding to the third COT sharing information is groupcast, the first resource indicated by the third COT sharing information is allocated only to a cluster member. In other words, the first resource indicated by the COT sharing information for groupcast communication may be only for the cluster member, and the out-cluster terminal device cannot communicate over the resource.

The first COT sharing information may indicate various types of information about the first resource. In some embodiments, the first COT sharing information may indicate time domain and/or frequency domain resources within the COT that are allocated to the second terminal device. In some embodiments, alternatively, the first COT sharing information may indicate an allowed duration of the use of the first resource. In some embodiments, alternatively, the first COT sharing information may indicate a time during which the second terminal device outside the communication cluster is allowed to access over the first resource.

That the first terminal device has allocated the first resource within the COT to the second terminal device may mean that the first terminal device allocates the resource to the in-cluster terminal device, or that the first terminal device allocates the remaining unused resource within the COT to the out-cluster terminal device.

The first resource allocated by the first terminal device may be determined based on various types of information. The various types of information are, for example, whether the second terminal device is a terminal device in a communication cluster in which the first terminal device is located, a priority corresponding to the second terminal device, and a type and priority of the second terminal device.

As a possible implementation, when the second terminal device is an in-cluster terminal device, the first terminal device may allocate the first resource based on a cluster-first manner. In other words, the cluster member has the highest priority, and the resource within the COT is preferentially allocated to the cluster member. In some embodiments, the first resource is allocated to one or more in-cluster terminal devices in the simplest manner. For example, in groupcast communication, the first terminal device may allocate time domain resources to the second terminal device according to the sequence of slots, and may also allocate frequency resources in different sub-channels in the same slot.

In some embodiments, the in-cluster terminal device may send a PSFCH to the first terminal device over the first resource. If the number of NACKs fed back by the second terminal device on a sidelink reaches a specific value, the first terminal device triggers retransmission, and still preferentially allocates a resource to the second terminal device. In some embodiments, if the number of NACKs fed back by the second terminal device is greater than a first threshold, the first terminal device allocates a resource for retransmission from resources within the COT to the second terminal device. The first threshold may be a positive integer, for example, 3.

As a possible implementation, when the second terminal device is an out-cluster terminal device, the first resource may be allocated based on the priority corresponding to the second terminal device. The priority corresponding to the second terminal device may be determined based on a first parameter. The first parameter may be related to one or more of the information such as a sidelink corresponding to the second terminal device, a resource required by the second terminal device, a queue in which the second terminal device is located, a waiting time of the second terminal device for resource allocation from the first terminal device, and a NACK fed back by the second terminal device to the first terminal device.

The first parameter may be a specific parameter of the above-mentioned information related to the priority of the second terminal device, or may be data directly indicating the priority and derived from the specific parameters of the above-mentioned one or more types of information, or may be data derived from a plurality of specific parameters of information, which is not limited herein.

In some embodiments, the first parameter may be determined based on related information of the sidelink corresponding to the second terminal device, so as to indicate the priority of the second terminal device. The related information is, for example, signal quality of the sidelink. The signal quality may be determined based on parameters such as reference signal received power (RSRP), reference signal receiving quality (RSRQ), and/or a signal to interference plus noise ratio (SINR) of the sidelink. The first terminal device may compare signal quality of different sidelinks, or may compare the signal quality of the sidelink with a specified threshold, so as to determine the priority corresponding to the second terminal device.

Taking the RSRP as an example, the higher the RSRP, the shorter the communication distance or the better the communication environment, and the resources within the COT can provide better services to the corresponding terminal device. Therefore, the first terminal device may set a threshold $RSRP_{target}$. If the RSRP of the sidelink corresponding to the second terminal device is greater than $RSRP_{target}$, the second terminal device may have a higher priority.

In some embodiments, the first parameter may be determined based on resource information required by the second terminal device. The resource information may be a size of a COT resource required by the second terminal device, or a type of the COT resource, or the like. For example, the second terminal device that requires a smaller COT resource may have a higher priority.

In some embodiments, the first parameter may be determined based on related information of the queue in which the second terminal device is located. In the case that a plurality of sidelinks are to share the COT resource, different terminal devices corresponding to the plurality of sidelinks may be set as a plurality of ready queues. The related information of the queue may be a priority sequence of each queue, or a length of each queue, or a time required for execution of each queue, etc. For example, the higher the priority of the queue, the higher the priority of the terminal device in the queue. For another example, the queue with a high priority may be allocated to the first slot within the COT. Time-frequency resources start to be allocated to the next queue only when the queue with the high priority is idle.

In some embodiments, the first parameter may be determined based on the waiting time of the second terminal device for resource allocation from the first terminal device, so as to prevent the terminal device from waiting too long without obtaining the resource. For example, a service rate factor a may be set in the first parameter, such that the priority of the terminal device increases at a rate a as the waiting time increases.

In some embodiments, the first parameter may be determined based on related information of the NACKs fed back by the second terminal device to the first terminal device. The related information of the NACKs may be the number of NACKs fed back, or a slot in which the NACKs fed back are located, or the like.

Taking the number of NACKs fed back by the second terminal device as an example, the first terminal device may set a threshold related to the NACKs, such as a second threshold. When the second threshold represents the number of NACKs, the second threshold may also be a positive integer, for example, 3 or 5. Specifically, if the number of NACKs fed back by the second terminal device is greater than the second threshold, the first terminal device may adjust the first parameter of the second terminal device to lower its priority. Alternatively, if the number of NACKs fed back by the second terminal device is greater than the second threshold, the first terminal device may no longer allocate a resource to the second terminal device corresponding to the sidelink.

In some embodiments, alternatively, the first parameter may be determined based on various types of related information of the second terminal device. As a possible implementation, the priority corresponding to the second terminal device may be determined based on a plurality of the following information: the signal quality of the sidelink corresponding to the second terminal device; the size of the resource required by the second terminal device; the priority of the queue in which the second terminal device is located; the waiting time of the second terminal device for resource allocation from the first terminal device; and the number of NACKs fed back by the second terminal device to the first terminal device. For example, when RSRPs of sidelinks corresponding to a plurality of second terminal devices are all greater than $RSRP_{target}$, the first parameter of the second terminal device requiring the smallest COT resource may indicate that the second terminal device has the highest priority.

If the resources shared by the first terminal device reach the highest value at a specific moment, for example, the $M \times N_{SubCHsize} \times T$ PRBs shown in FIG. 11, the first terminal device stops the allocation. Other terminal devices that are to perform sidelink communication may continue monitoring, or wait for a next allocation.

After receiving the first sidelink channel, the second terminal device may obtain the first COT sharing information in the first sidelink channel. In some embodiments, based on the first resource indicated by the first COT sharing information, the in-cluster terminal device may perform sidelink communication with other members in the cluster. In some embodiments, based on the first resource indicated by the first COT sharing information, the out-cluster terminal device may choose an opportunity to join the COT shared by the first terminal device, and use the remaining resources for sidelink communication. For example, the out-cluster terminal device may perform sidelink communication with other terminal devices. The other terminal devices here may be in-cluster devices, or other out-cluster devices.

As described above, after receiving the first resource, the second terminal device may feed back the usage of the first resource to the first terminal device. In some embodiments, the second terminal device outside the communication cluster may send a PSFCH to the first terminal device to indicate impact of the first resource on a communication result. For example, when the second terminal device feeds back an ACK, it may indicate that the communication using the first resource succeeds. For another example, when the second terminal device feeds back a NACK, it may indicate that the communication using the first resource fails, and resource reallocation is to be requested.

The second terminal device may further perform feedback over the first resource to other terminal devices on the sidelink, indicating a result of the current communication.

As can be seen from the communication method of the two terminal devices in FIG. 12, the first terminal device can allocate the resources within the COT to the second terminal device according to a specific rule by sending the first sidelink channel including resource allocation information. This rule ensures that the resources are allocated preferentially to the in-cluster terminal devices, and the use of the resources within the COT can be effectively improved by setting a reasonable priority rule for the out-cluster terminal device.

Figure 13:
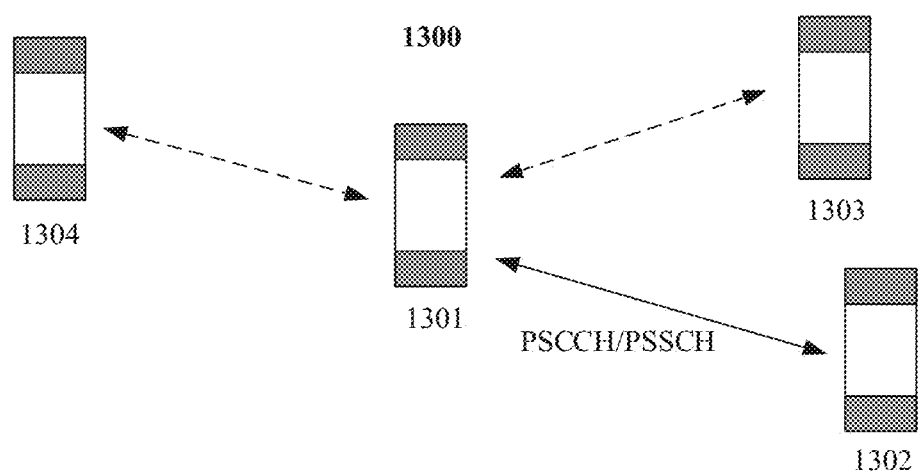
FIG. 13 is an example diagram of a system of unicast communication in SL-U.
Figure 14:
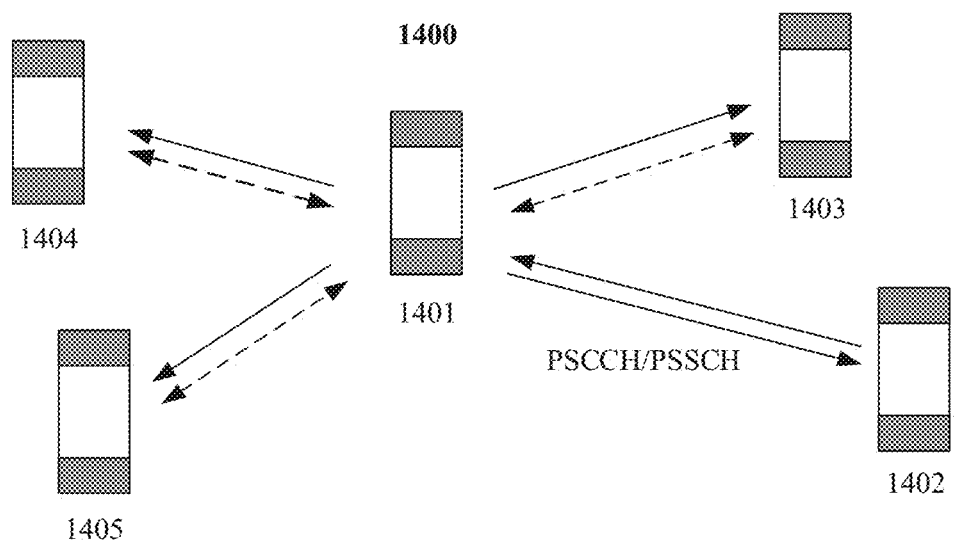
FIG. 14 is an example diagram of a system of groupcast communication in SL-U.

The unicast and groupcast communication modes in the sidelink mentioned above are described in detail below with reference to FIG. 13 and FIG. 14 by taking unicast and groupcast communication in SL-U as an example. FIG. 13 is an example diagram of a system of unicast communication in SL-U. FIG. 14 is an example diagram of a system of groupcast communication in SL-U.

Referring to FIG. 13, the SL-U unicast communication system 1300 includes terminal devices 1301 to 1304. After accessing a network through LBT, the terminal device 1301 may initiate COT sharing. The terminal device 1301 transmits a PSCCH and a PSSCH that carries first COT sharing information to the terminal device 1302.

The terminal device 1302 is an in-cluster terminal device that communicates with the terminal device 1301 on a sidelink. The terminal device 1302 obtains transmission and scheduling information SCI related to the sidelink by demodulating the PSCCH. The SCI can help the terminal device 1302 to receive and decode sidelink information. The terminal device 1302 may obtain a first resource indicated by the first COT sharing information after receiving the PSSCH.

The terminal devices 1303 and 1304 are out-cluster terminal devices that are to perform sidelink communication through the COT sharing by the terminal device 1301. The terminal devices 1303 and 1304 may obtain the first COT sharing information through detection, so as to choose an opportunity to join the COT sharing by the first terminal device. The first terminal device 1301 may allocate the first resource to the terminal devices 1303 and 1304 according to the foregoing priority principle.

Referring to FIG. 14, the SL-U groupcast communication system 1400 includes terminal devices 1401 to 1405. The terminal device 1401 communicates with its cluster member terminal devices 1402 to 1405 in a groupcast mode.

The terminal device 1401 is an initiating terminal of the COT sharing. The cluster member terminal devices 1402 to 1405 receive information from the terminal device 1401, demodulate the PSCCH/PSSCH, and obtain a start point, an end point, a duration, etc. of the COT sharing. The COT sharing information for the corresponding groupcast is only for the cluster members. Other non-in-cluster terminals cannot communicate over the shared resource.

The cluster member terminal devices 1402 to 1405 usually have a short communication distance, or the cluster is established for some important reasons. Therefore, when only the cluster members perform sidelink communication over COT shared resources, the terminal device 1401 allocates the resources in the simplest manner.

The non-in-cluster members obtain the COT sharing information by detecting COT-SI$_{unicast}$ for the corresponding unicast by the terminal device 1401. The non-in-cluster members can perform sidelink communication over resources within the sharing information for the corresponding unicast. Therefore, the resource allocation by the terminal device 1401 involves cluster members and possibly non-cluster members.

The method embodiments of the present application are described in detail above with reference to FIG. 6 to FIG. 14. The apparatus embodiments of the present application are described in detail below with reference to FIG. 15 to FIG. 16. It should be understood that the description of the apparatus embodiments corresponds to the description of the method embodiments, and therefore, for parts that are not described in detail, reference may be made to the foregoing method embodiments.

Figure 15:
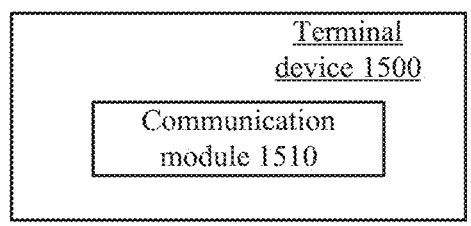
FIG. 15 is a schematic structural diagram of a terminal device according to an embodiment of the present application.

FIG. 15 is a schematic structural diagram of a terminal device according to an embodiment of the present application. The terminal device is configured as a first terminal device, and may perform the communication method at the transmitter end described above in FIG. 6. As shown in FIG. 15, the terminal device 1500 includes a communication module 1510.

The communication module 1510 may be configured to send a first sidelink channel to a second terminal device over a first sidelink, where the first sidelink channel includes first COT sharing information, and the first COT sharing information satisfies one or more of the following: the first COT sharing information is carried in a first PSSCH of the first sidelink channel; and the first COT sharing information includes second COT sharing information and third COT sharing information, with the second COT sharing information corresponding to a first communication mode, and the third COT sharing information corresponding to a second communication mode.

Optionally, the first sidelink channel further includes a first PSCCH, the first PSCCH includes first stage SCI, and time domain resources on which the first COT sharing information and the first stage SCI are located are adjacent.

Optionally, the last symbol on which the first stage SCI is located is a first symbol, and the time domain resource on which the first COT sharing information is located includes one symbol or two consecutive symbols following the first symbol.

Optionally, the first sidelink channel further includes first stage SCI and second stage SCI, time domain resources on which the second COT sharing information and the first stage SCI are located are adjacent, and time domain resources on which the third COT sharing information and the second stage SCI are located are adjacent; or time domain resources on which the third COT sharing information and the first stage SCI are located are adjacent, and time domain resources on which the second COT sharing information and the second stage SCI are located are adjacent.

Optionally, the second COT sharing information and the third COT sharing information each occupy one symbol.

Optionally, the first COT sharing information is used to indicate one or more of the following information: a COT start time; a COT end time; a COT duration; unused resources within the COT; and resources allowed to be used by a third terminal device participating in COT sharing.

An embodiment of the present application further provides a terminal device. The terminal device is configured as a second terminal device, and may perform the communication method at the receiver end described above in FIG. 6. The second terminal device includes a communication module.

The communication module may be configured to receive, over a first sidelink, a first sidelink channel sent by a first terminal device, where the first sidelink channel includes first COT sharing information, and the first COT sharing information satisfies one or more of the following: the first COT sharing information is carried in a first PSSCH of the first sidelink channel; and the first COT sharing information includes second COT sharing information and third COT sharing information, with the second COT sharing information corresponding to a first communication mode, and the third COT sharing information corresponding to a second communication mode.

Optionally, the first sidelink channel further includes a first PSCCH, the first PSCCH includes first stage SCI, and time domain resources on which the first COT sharing information and the first stage SCI are located are adjacent.

Optionally, the last symbol on which the first stage SCI is located is a first symbol, and the time domain resource on which the first COT sharing information is located includes one symbol or two consecutive symbols following the first symbol.

Optionally, the first sidelink channel further includes first stage SCI and second stage SCI, time domain resources on which the second COT sharing information and the first stage SCI are located are adjacent, and time domain resources on which the third COT sharing information and the second stage SCI are located are adjacent; or time domain resources on which the third COT sharing information and the first stage SCI are located are adjacent, and time domain resources on which the second COT sharing information and the second stage SCI are located are adjacent.

Optionally, the second COT sharing information and the third COT sharing information each occupy one symbol.

Optionally, the first COT sharing information is used to indicate one or more of the following information: a COT start time; a COT end time; a COT duration; unused resources within the COT; and resources allowed to be used by a third terminal device participating in COT sharing.

An embodiment of the present application further provides a terminal device. The terminal device is configured as a first terminal device, and may perform the communication method at the transmitter end described above in FIG. 12. The first terminal device includes a communication module.

The communication module may be configured to send a first sidelink channel, where the first sidelink channel includes first COT sharing information, and the first COT sharing information is used to indicate that the first terminal device has allocated a first resource within a COT to a second terminal device; and the first resource is determined based on one or more of the following information: whether the second terminal device is a terminal device in a communication cluster in which the first terminal device is located; and a priority corresponding to the second terminal device.

Optionally, the priority corresponding to the second terminal device is determined based on a first parameter, and the first parameter is related to one or more of the following information: a sidelink corresponding to the second terminal device, a resource required by the second terminal device, a queue in which the second terminal device is located, a waiting time of the second terminal device for resource allocation from the first terminal device, and a NACK fed back by the second terminal device to the first terminal device.

Optionally, the first COT sharing information includes second COT sharing information and third COT sharing information, with the second COT sharing information corresponding to a first communication mode, and the third COT sharing information corresponding to a second communication mode.

Optionally, if the second terminal device is a terminal device in the communication cluster, the first resource is allocated based on a cluster-first manner.

Optionally, if the second terminal device is a terminal device in the communication cluster, the communication module is further configured to: if the number of NACKs fed back by the second terminal device is greater than a first threshold, the first terminal device allocates a resource for retransmission from resources within the COT to the second terminal device.

Optionally, if the second terminal device is a terminal device outside the communication cluster, the first resource is determined based on the priority of the second terminal device.

Optionally, if the second terminal device is a terminal device outside the communication cluster, the communication module is further configured to: if the number of NACKs fed back by the second terminal device is greater than a second threshold, the first terminal device lowers the priority of the second terminal device.

An embodiment of the present application further provides a terminal device. The terminal device is configured as a second terminal device, and may perform the communication method at the receiver end described above in FIG. 12. The second terminal device includes a communication module.

The communication module may be configured to receive a first sidelink channel, where the first sidelink channel includes first COT sharing information, and the first COT sharing information is used to indicate that a first terminal device has allocated a first resource within a COT to the second terminal device; and the first resource is determined based on one or more of the following information: whether the second terminal device is a terminal device in a communication cluster in which the first terminal device is located; and a priority corresponding to the second terminal device.

Optionally, the priority corresponding to the second terminal device is determined based on a first parameter, and the first parameter is related to one or more of the following information: a sidelink corresponding to the second terminal device, a resource required by the second terminal device, a queue in which the second terminal device is located, a waiting time of the second terminal device for resource allocation from the first terminal device, and a NACK fed back by the second terminal device to the first terminal device.

Optionally, the first COT sharing information includes second COT sharing information and third COT sharing information, with the second COT sharing information corresponding to a first communication mode, and the third COT sharing information corresponding to a second communication mode.

Optionally, if the second terminal device is a terminal device in the communication cluster, the first resource is allocated based on a cluster-first manner.

Optionally, if the second terminal device is a terminal device outside the communication cluster, the first resource is determined based on the priority of the second terminal device.

Figure 16:
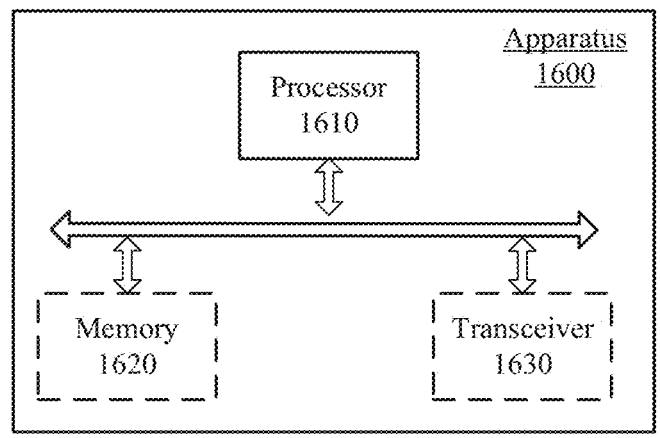
FIG. 16 is a schematic structural diagram of a communication apparatus according to an embodiment of the present application.

FIG. 16 is a schematic structural diagram of a communication apparatus according to an embodiment of the present application. The dashed line in FIG. 16 indicates that the unit or module is optional. The apparatus 1600 in FIG. 16 may be configured to implement the methods described in the foregoing method embodiments. The apparatus 1600 may be a chip, a terminal device, or a network device.

The apparatus 1600 may include one or more processors 1610. The processor 1610 may allow the apparatus 1600 to implement the methods described in the foregoing method embodiments. The processor 1610 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like.

The apparatus 1600 may further include one or more memories 1620. The memory 1620 stores a program that can be executed by the processor 1610 to cause the processor 1610 to perform the methods described in the foregoing method embodiments. The memory 1620 may be independent of the processor 1610 or may be integrated in the processor 1610.

The apparatus 1600 may further include a transceiver 1630. The processor 1610 can communicate with another device or chip through the transceiver 1630. For example, the processor 1610 can send and receive data to and from another device or chip through the transceiver 1630.

An embodiment of the present application further provides a computer-readable storage medium for storing a program. The computer-readable storage medium can be applied to the terminal or the network device provided in the embodiments of the present application, and the program causes a computer to perform the methods to be performed by the terminal or the network device in various embodiments of the present application.

An embodiment of the present application further provides a computer program product. The computer program product includes a program. The computer program product can be applied to the terminal or the network device provided in the embodiments of the present application, and the program causes a computer to perform the methods to be performed by the terminal or the network device in various embodiments of the present application.

The terms "system" and "network" in the present application can be used interchangeably. In addition, the terms used in the present application are only used to explain the specific embodiments of the present application, and are not intended to limit the present application. It should be noted that the terms "first", "second", "third", "fourth", etc. in the specification, claims, and drawings of the present application are used to distinguish between different objects, rather than to describe a specific order. In addition, the terms "comprise" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B can be obtained by means of A; or may mean that A indirectly indicates B, for example, A indicates C, and B can be obtained by means of C; or may mean that there is an association relationship between A and B.

In the embodiments of the present application, the term "corresponding" may mean that there is a direct or indirect correspondence between the two, or may mean that there is an association relationship between the two, which may also be a relationship such as indicating and being indicated, or configuring and being configured.

In the embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, pre-defined may refer to defined in the protocol.

In the embodiments of the present application, determining B based on A does not mean determining B based only on A, but instead B may be determined based on A and/or other information.

In the embodiments of the present application, the term "and/or" is merely used to describe an association relationship between associated objects, indicating that there may be three relationships. For example, A and/or B may indicate that: only A exists, both A and B exist, and only B exists. In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, device, and method may be implemented in other manners. For example, the described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units are integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on the computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A communication method, comprising:
sending, by a first terminal device, a first sidelink channel to a second terminal device over a first sidelink, wherein the first sidelink channel comprises first channel occupancy time (COT) sharing information, wherein the first sidelink channel further comprises a first physical sidelink control channel (PSCCH), the first PSCCH comprises first stage sidelink control information (SCI), and time domain resources on which the first COT sharing information and the first stage SCI are located are adjacent, and wherein the first COT sharing information is carried in a first physical sidelink shared channel (PSSCH) of the first sidelink channel.

2. The communication method according to claim 1, wherein the first COT sharing information comprises information corresponding to a communication mode.

3. The communication method according to claim 1, wherein a last symbol on which the first stage SCI is located is a first symbol, and a time domain resource on which the first COT sharing information is located comprises one symbol or two consecutive symbols following the first symbol.

4. The communication method according to claim 1, wherein the first COT sharing information indicates at least one of the following information:
a COT start time;
a COT end time;
a COT duration;
unused resources within the COT; or
resources allowed to be used by a third terminal device participating in COT sharing.

5. A communication method, comprising:
receiving, by a second terminal device and over a first sidelink, a first sidelink channel sent by a first terminal device, wherein the first sidelink channel comprises first channel occupancy time (COT) sharing information, wherein the first sidelink channel further comprises a first physical sidelink control channel (PSCCH), the first PSCCH comprises first stage sidelink control information (SCI), and time domain resources on which the first COT sharing information and the first stage SCI are located are adjacent, and wherein the first COT sharing information is carried in a first physical sidelink shared channel (PSSCH) of the first sidelink channel.

6. The communication method according to claim 5, wherein the first COT sharing information comprises information corresponding to a communication mode.

7. The communication method according to claim 5, wherein a last symbol on which the first stage SCI is located is a first symbol, and a time domain resource on which the first COT sharing information is located comprises one symbol or two consecutive symbols following the first symbol.

8. The communication method according to claim 5, wherein the first COT sharing information indicates at least one of the following information:
a COT start time;
a COT end time;
a COT duration;
unused resources within the COT; or
resources allowed to be used by a third terminal device participating in COT sharing.

9. A first terminal device, comprising:
at least one processor; and
one or more memories coupled to the at least one processor and storing programming instructions for execution by the at least one processor to cause the first terminal device to:
send a first sidelink channel to a second terminal device over a first sidelink, wherein
the first sidelink channel comprises first channel occupancy time (COT) sharing information, wherein the first sidelink channel further comprises a first physical sidelink control channel (PSCCH), the first PSCCH comprises first stage sidelink control information (SCI), and time domain resources on which the first COT sharing information and the first stage SCI are located are adjacent, and wherein the first COT sharing information is carried in a first physical sidelink shared channel (PSSCH) of the first sidelink channel.

10. The first terminal device according to claim 9, wherein the first COT sharing information comprises information corresponding to a communication mode.

11. The first terminal device according to claim 9, wherein a last symbol on which the first stage SCI is located is a first symbol, and a time domain resource on which the first COT sharing information is located comprises one symbol or two consecutive symbols following the first symbol.

12. The first terminal device according to claim 9, wherein the first COT sharing information indicates at least one of the following:
a COT start time;
a COT end time;
a COT duration;
unused resources within the COT; or
resources allowed to be used by a third terminal device participating in COT sharing.

* * * * *